United States Patent [19]

Nordström et al.

[11] Patent Number: 4,531,080
[45] Date of Patent: Jul. 23, 1985

[54] CONTROLLER

[75] Inventors: Lennart Nordström; Tommy Sävström, both of Linköping, Sweden

[73] Assignee: Saab-Scania Aktiebolag, Linkoping, Sweden

[21] Appl. No.: 499,240

[22] Filed: May 13, 1983

[30] Foreign Application Priority Data

Jun. 1, 1982 [SE] Sweden .................. 8203350

[51] Int. Cl.³ ............................................. B64C 13/16
[52] U.S. Cl. .................................. 318/628; 318/648;
318/649; 318/580; 74/471 XY; 338/128;
244/234; 244/236; 244/237; 364/190
[58] Field of Search ............... 318/628, 566, 648, 649,
318/580; 244/75 R, 175, 234, 236, 237; 74/471
XY, 523, 492; 338/128

[56] References Cited

U.S. PATENT DOCUMENTS

| 2,475,484 | 7/1949 | Nise | 318/628 |
|---|---|---|---|
| 3,011,739 | 12/1961 | Boyce et al. | 244/83 |
| 3,017,142 | 1/1962 | Rossire | 244/234 X |
| 3,076,624 | 2/1963 | Lewis | 244/236 |
| 3,299,731 | 1/1967 | Russell | 244/234 X |
| 3,409,252 | 11/1968 | Miller | 244/234 X |
| 3,523,665 | 8/1970 | Laynor | 244/237 X |
| 3,771,037 | 11/1973 | Bailey | 244/237 X |
| 4,012,014 | 3/1977 | Marshall | 74/471 XY X |
| 4,106,728 | 8/1978 | Griffith | 318/628 X |
| 4,441,676 | 4/1984 | Rowarth | 74/471 XY X |
| 4,469,330 | 9/1984 | Asher | 74/471 XY X |

Primary Examiner—William M. Shoop
Assistant Examiner—Paul Shik Luen Ip
Attorney, Agent, or Firm—James E. Nilles; James R. Custin

[57] ABSTRACT

A controller for producing electrical control signals has a relatively stationary supporting section providing an upwardly facing hand supporting surface and an upward projection, and has a stick-like control section mounted on a first gimbal joint on top of the projection, to swing about pitch and roll axes. A second gimbal joint is spaced along the roll axis from the first one and rotates about said roll axis and about a gimbal axis parallel to the pitch axis. A gimbal ring of the first joint is rigidly connected to a gimbal member of the second joint for unison rotation about the roll axis. A second gimbal member of the second joint is caused to rotate about said gimbal axis in unison with swinging of the control section about the pitch axis by a linkage connection between them. A signal generator for each of the pitch and roll axes and a stick force generating means for each of those axes are connected with respective gimbal members of the second joint.

9 Claims, 5 Drawing Figures

CONTROLLER

The present invention relates to a controller for producing electrical control signals for actuating controllable elements.

The controller can be used in any field where control about two axes of freedom is required. The controller is particularly suitable for aircraft with control surfaces which are manipulated by the "fly-by-wire" method, wherein the aircraft has an electrical control system for producing electrical control signals according to the deflecting movements of a control stick and for transmitting the control signals via electrical cables to servomotors for actuating the control surfaces of the aircraft. With this method the large levers previously used can be eliminated, and considerably smaller control sticks may be used. Other factors which have urged development in the direction of small control sticks and the "fly-by-wire" method are the very restricted space in today's advanced aircraft and the fact that advanced flying techniques require the assistance of a flight computer.

U.S. Pat. No. 4,012,014 discloses a controller with a control stick which can be gripped by the pilot's hand and which is supported for universal swinging motion about a center that is located inside the grip of the pilot's hand as it embraces the control stick. Owing to the restricted cross-section of the stick, there is no room inside it for the main components of the controller such as a signal generator for producing control signals and a stick force generator for feeding back to the stick a force corresponding to the deflection of the stick, especially if there is a requirement for redundancy, e.g., if three signal generators are required. For each of its two axes of freedom, the stick is therefore connected, by means of a linkage, to a signal generator and to a mechanical stick force generator in the form of a compression spring. As in other known constructions, each of these linkages, together with its respective signal generator and stick force generator, entails disadvantages such as friction, loose play, and hysteresis in the translation of stick deflection into output signals from the signal generator and in the amount of force fed back from the stick force generator to the stick.

The object of the present invention is to provide a controller of the above described character wherein the control stick has its center of rotation within the grip of a hand embracing it, wherein the controller can convert control stick deflection from a neutral position into electrical control signals and a force acting on the stick to urge it back towards its neutral position, and wherein there is a negligible amount of friction, loose play and hysteresis notwithstanding that the control stick of the controller occupies only a small amount of space. It is also an object of the invention to attain these goals at reasonable cost.

These objects are achieved by means of a controller for producing electrical control signals for controllable elements, which comprises a control stick designed to be embraced by the hand, a first gimbal joint located to be within the grip of a hand embracing the stick and defining two axes of rotation for the movements of the stick, a signal device and a stick force generating unit appertaining to each axis of rotation, and movement transmitting units which operatively connect the stick via gimbal joints to the signal device and the stick force generating unit respectively.

The invention is described in more detail below, with reference to the accompanying drawings, which illustrate what is now regarded as a preferred embodiment of the invention and in which.

Although the invention may be used for a number of different applications, such as for manipulators, the controller shown here is especially adapted for an aircraft, for controlling movements of its control surfaces.

Figure 1:
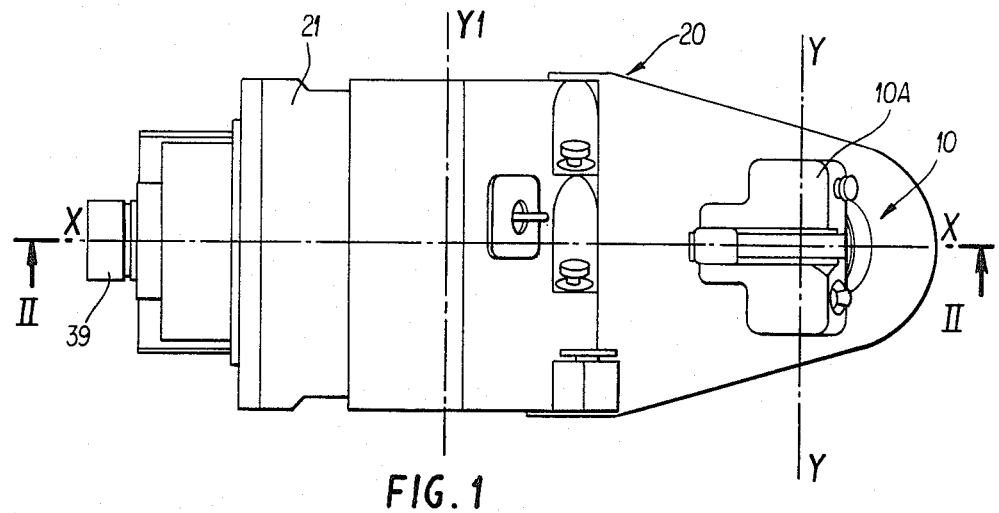
FIG. 1 shows the controller in a plan view looking from above.
Figure 3:
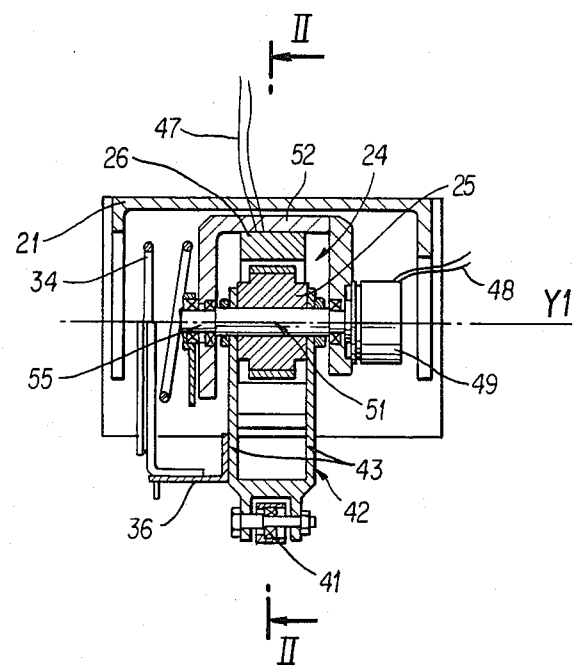
FIG. 3 is a view of the controller in partial section taken along the line III—III in FIG. 2.
Figure 2:
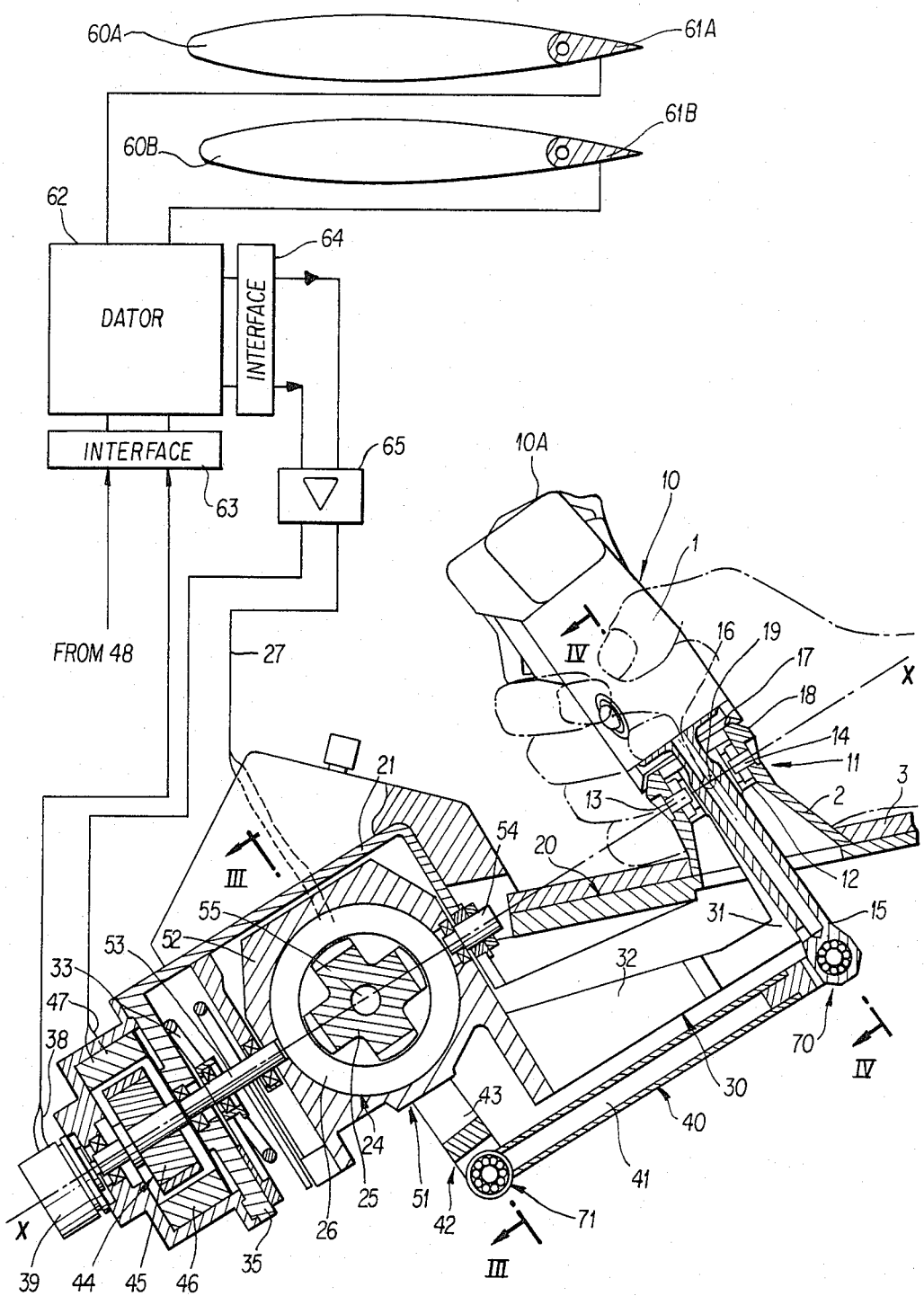
FIG. 2 is a view, partially in section through the controller along the line II—II in FIGS. 1 and 3, with an associated block diagram showing the basic principle of how the controller is used in an aircraft.

As can be seen from FIGS. 1–3, the controller has a control stick 10 which projects from a frame structure 20. Via movement transmitting units 30, 40 for a roll channel and a pitch channel, respectively, the deflection movements of the stick 10 are transmitted to signal generators 39, 49 for producing control signals for servo units (not shown) that actuate control surfaces 61A, 61B, of which only two are shown schematically in FIG. 2 as ailerons on the wings 60A, 60B.

The stick 10 is dimensioned so that it can be embraced by the right hand of a pilot, and it comprises an upper movable control section 1 and a lower supporting section 2 that is fixed to the frame structure 20, the latter section being designed to be encircled by the little finger of the hand. The control section 1 has an upper part or head 10A equipped with a plurality of function buttons, and, when the stick is being held, this head projects up between the thumb and index finger of the hand, in a known way, as shown in FIG. 2. The control section 1 has a common center of rotation 19 about two perpendicular axes X and Y, of which the X axis corresponds to the roll axis and is shown in FIG. 2 in the plane of the drawing, while the Y axis corresponds to the pitch axis and in FIG. 2 extends perpendicular to the plane of the drawing, through the center of rotation 19. In FIG. 1 both the X and the Y axes are parallel to the plane of the drawing.

Figure 4:
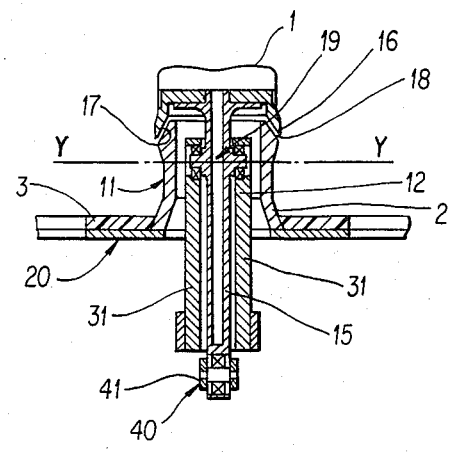
FIG. 4 is a view in section through the controller stick taken along the line IV—IV in FIG. 2.
Figure 5:
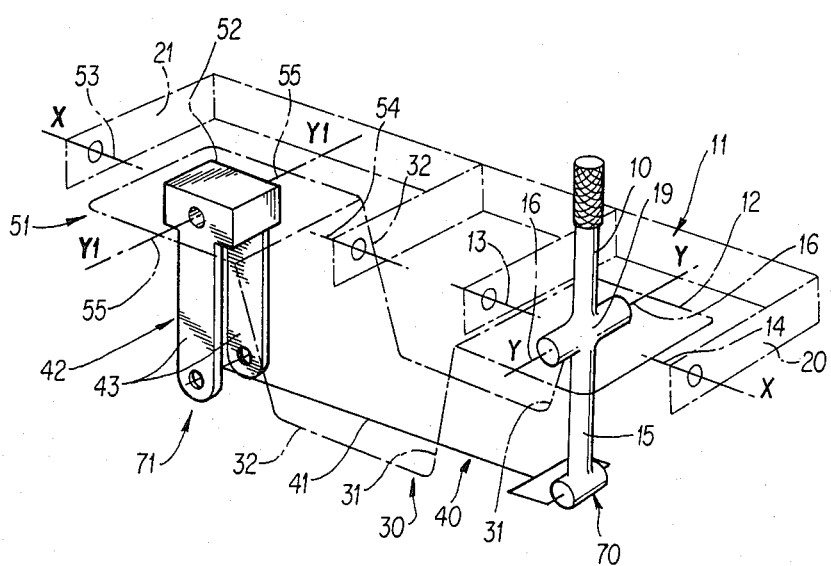
FIG. 5 is a very diagrammatic perspective view of the gimbal linkage.

The control section 1 swings on a gimbal joint (sometimes known as a Cardan joint) 11 that is fitted on the upper part of the supporting section 2. In a known arrangement, the gimbal joint 11 has a housing in the form of a gimbal ring 12 which is pivotably mounted on the upper part of the supporting section, on shafts 13, 14 that extend in radially opposite directions from the ring and along the roll axis of rotation X. A central arm 15 that is rigidly connected to the control section 1 extends axially through the gimbal ring 12 and is pivoted to it by means of shafts 16 which are coaxial to the Y axis. The shafts 16 are best seen in FIG. 4, and one of them is shown in broken lines in FIG. 2, wherein it extends perpendicular to the plane of the drawing. Between them, the control section 1 and the supporting section 2 have complementary spherical opposing partial surfaces 17 and 18 respectively, the center of curvature of which lies in the center of rotation 19 of the stick.

Due to the fact that the common center of rotation 19 of the control stick, or more specifically of the control section 1, lies in the parts of the stick that are embraced by the pilot's hand, the stick can be maneuvered by hand movements alone, so that the pilot receives a sensation of considerable resolution from the deflection movements of the stick and can carry out control corrections quickly and precisely.

The supporting section 2 of the control stick projects out from a supporting plane 3 on the frame structure 20. The supporting plane 3 is located below the center of rotation 19 of the gimbal joint 11 and underlies the lower edge of the hand. Like the supporting section 2 of the control stick, the supporting plane 3 serves as a reference and provides an excellent support for the hand during accelerations in the vertical direction. Although the supporting plane 3 is shown as a flat surface, it will be appreciated that its surface may be curved to conform it to the lower edge of the hand.

Another gimbal joint 51 is connected by means of movement transmitting units 30, 40 to the gimbal joint 11. The two gimbal joints 11 and 51 have one common axis of rotation, namely the X axis (FIGS. 1 and 2) which corresponds with the roll axis; and the gimbal joint 51 also rotates about an axis Y1 which is parallel to the Y axis. The Y1 axis thus also corresponds to a pitch axis. In addition to being compact and mechanically simple, arranging the gimbal joints 11 and 51 with a common roll axis causes the movable parts to have a lower moment of inertia relative to the roll axis X and to their respective parallel pitch axes Y, Y1, thus freeing the stick from undesirable mass forces during large accelerations, so that the pilot obtains a true stick force reaction.

Accordingly, the second gimbal joint 51 comprises a housing 52 that is pivotally mounted, by means of shafts 53, 54 that are coaxial with the X axis, in a casing 21 formed in the relatively stationary frame structure 20. At least one shaft 53 is non-rotatably connected to the housing 52 in order to transmit its rotating movement to the signal generator 39, which is connected to an extension of the shaft 53.

The movement transmitting unit 30 transmits motions about the roll axis X from the gimbal ring 12 to the gimbal housing 52. It is a rigid rocker which is rigidly connected with those two gimbal elements. It comprises a pair of arms 31 that extend generally downward from the gimbal ring 12 and are spaced to opposite sides of a plane of symmetry that contains the roll axis. Each of the arms 31 is rigidly connected with an arm 32 at its side of said plane that projects down from the gimbal housing 52. The rocker 30 and the gimbal housing 52 can thus be formed in one piece, wherein the arms 31, 32 project fork-like from that housing.

The other movement transmitting unit 40, for transmitting movement in the pitch direction, comprises a linkage mechanism which is located in the plane of symmetry of the rocker 30, between its two parts. Comprised in the linkage mechanism 40 is the arm 15, which has a portion above the gimbal joint 11 that is rigidly connected to the control section 1 of the control stick, and which has another portion extending downward from that joint as a connecting arm. At its bottom the arm 15 has an articulated connection 70 to one end of a link 41, the other end of which has an articulated second connection 71 to a connecting arm 42 in the shape of a shackle. The two shanks 43 of the connecting arm 42 are non-rotatably connected to a shaft 55 (see FIG. 3) which is coaxial with the pitch axis of rotation Y1 and which is rotatably mounted in the gimbal housing 52.

Preferably, as shown in FIG. 2, the connecting arms 15 and 42 are parallel and of equal length as calculated from the centers of rotation of the respective gimbal joints, so that the centers of articulation of the line 41 are on a line parallel to the roll axis X and every deflection of the control section 1 in the pitch direction as well as in the roll direction is represented by a similar amount of rotation in the second gimbal joint 51. In the movement transmitting unit 40 which, as described above, is between the parts of the rocker 30, the articulated connections 70 and 71 at the ends of the link 41 comprise ball bearings, to obtain minimal friction, play and hysteresis in the pitch direction movements. Since the movement transmitting unit 30 is a rigid rocker, every deflection of the control section 1 in the roll direction is transmitted directly and without play or hysteresis to the second gimbal joint 51.

Each of the signal generators 39 and 49 is connected to its respective shaft of the gimbal joint 51. The signal generator 39, which emits a control signal proportional to the angular deflection of the control stick around the roll axis of rotation X, is connected between the extended shaft 53 and the relatively stationary casing 21. The signal generator 49, which emits a control signal proportional to the angular displacement of the control stick around the pitch axis of rotation Y, is connected between the shaft 55 of the gimbal joint 51 and its housing 52, in which the shaft 55 rotates about the Y1 axis. Through output leads 38 and 48 the output signals from the respective signal generators are transmitted via an interface circuit 63 to a flight computer 62, in an arrangement which is generally known. After processing in a known manner in the flight computer 62, the control signals are supplied to servo units (not shown) for actuating the respective control surfaces 61A and 61B.

Suitably, the signal generators are of the contactless type.

A particularly suitable signal generator is the so-called RVDT (rotary variable differential transformer), the fixed element of which is constructed as a transformer with primary and secondary windings, the degree of coupling between the windings being varied by means of the movable element of the generator which in this case is connected to the respective shaft 53 or 55.

In order to hold the control stick in a desired neutral position when it is not being influenced by external forces, two springs 33 and 34 are provided at the second gimbal joint 51 in order to exert forces biasing the stick back to its neutral position. One of said springs 33 (FIG. 2) is connected between the rotatable housing 52 and a partition wall 35 in the relatively stationary casing 21, while the second spring 34 (FIG. 3) is connected between the housing 52 and the shackle-shaped linkage arm 42 via an angular bracket 36 attached thereto. The springs 33, 34 are shown as cylindrical coiled springs, a few turns of which are wound coaxially with the axes X, Y1 respectively. The springs have a strong effect so that they serve substantially as bowsprings during bending out in each direction in a magnitude of 20°. The springs 33, 34 can be adjusted at their fixing points to adjust the neutral position.

Each axis of rotation X, Y1 of the second gimbal joint 51 has an associated torque motor 44, 24, preferably a brushless motor, which is connected directly to its respective shaft 53 or 55. Accordingly, FIG. 2 shows how the shaft 55 has a core 25 attached to it which serves as a rotor in a first torque motor, the stator 26 of which is fixed in the gimbal housing 52. As can be seen in FIG.

3, the shanks 43 of the connecting arm 42 straddle the core 25.

Similarly, the rotor 45 of the second torque motor 44 is rigidly connected to the extension of the shaft 53, while its stator 46 is connected to the casing 21 in a separate space in front of the partition wall 35 in the casing 21. Each torque motor has supply lines 27, 47 which are shown schematically in FIG. 2.

The flight computer 26 is designed to control by program the directly acting torque motors 24, 44 according to the flight situation and via an interface circuit 64 and an amplifier 65, so that forces produced by the torque motors are superimposed upon the forces produced by the springs 33, 34 that bias the stick section 1 towards its neutral position, to provide desired forces, primarily for centering and damping, that give the pilot the sensation of stick forces fed back from the control surfaces. Thus, the "break-out" levels of the control stick are established via the flight computer 62.

By using contactless signal generators and brushless, directly connected torque motors in combination with the second gimbal joint 51, friction occurs only in the bearings of the movable components, and this friction can be kept very low by using ball bearings.

While the active components of the controller—namely, the signal generators, stick force generators, and torque motor—are positioned at a distance from the control stick and the space surrounding it, the pilot obtains a sensation from the controller as if its components were positioned at the first gimbal joint 11.

What is claimed as the invention is:

1. A controller for producing control signal outputs for controlling the actuation of movable elements, of the type comprising a stick-like control section which can be embraced by a hand, a gimbal joint upon which the control section is mounted to swing about a pair of mutually perpendicular stick axes that extend substantially transversely to the length of the control section and intersect at a location to be surrounded by a hand embracing the control section, a signal generator for each said axis for producing a control signal output corresponding to displacement of the control section about the signal generator's axis from a neutral position, stick force generating means for each said axis for biasing the control section towards its neutral position, and motion transmitting means for operatively connecting the control section with the respective signal generators and stick force generating means, said controller being characterized by:
   A. means comprising a second gimbal joint having members to which said signal generators and stick force generating means are connected and which are rotatable about a pair of mutually perpendicular gimbal axes, each corresponding to one of said stick axes, that intersect at a point spaced from said location; and
   B. motion transmitting means connecting the first mentioned gimbal joint with the members of said second gimbal joint to constrain said members to rotate about their respective gimbal axes in unison with swinging of the control section about the corresponding stick axes.

2. The controller of claim 1, further characterized by:
   C. one of said gimbal axes coinciding with one of said stick axes, and said point at which said gimbal axes intersect being spaced along said coinciding axes from said location.

3. The controller of claim 2 wherein the first mentioned gimbal joint comprises a gimbal ring rotatable about said one stick axis and means mounting said control section for rotation with said gimbal ring about said one stick axis and relative to said gimbal ring about the other stick axis, further characterized by:
   (1) one of said gimbal members being rotatable about said coinciding axes and the other gimbal member being rotatable with said one gimbal member about said coinciding axes and relative to said one gimbal member about the other gimbal axis; and
   (2) said motion transmitting means comprising
      (a) means providing a rigid connection between said gimbal ring and said one gimbal member, and
      (b) means providing a link connection between said control section and said other gimbal member.

4. The controller of claim 3 wherein said other gimbal axis is parallel to said other stick axis, further characterized by:
   said means providing a link connection having articulated joints which swing about axes parallel to said other stick axis.

5. The controller of claim 1 wherein each of said stick force generating means comprises a torque motor.

6. The controller of claim 3 wherein the first mentioned gimbal joint is carried by a relatively stationary supporting section and wherein each of said stick force generating means comprises a torque motor having a relatively stationary component and a rotatable component, further characterized by:
   (1) said one gimbal member comprising the relatively stationary component of one of said torque motors, and
   (2) the relatively stationary component of the other of said torque motors being fixed in relation to said supporting section.

7. The controller of claim 1 wherein the first mentioned gimbal joint is carried by a relatively stationary supporting section, further characterized by:
   said supporting section having
   (1) an upwardly facing surface for supporting the lower edge of a hand embracing the control section, and
   (2) a projecting portion which extends above said surface, upon the upper portion of which the first mentioned gimbal joint is mounted, and which is embraced by a hand that embraces said control section.

8. A controller for producing control signal outputs for controlling the actuation of movable elements, of the type comprising a stick-like control section which can be embraced by a hand and which is swingable about a pair of mutually perpendicular stick axes that intersect within the embrace of the hand and extend substantially transversely to the length of the control section, a signal generator for each said axis for producing a control signal output corresponding to displacement of the control section about the signal generator's axis from a neutral position, and stick force generating means for biasing the control section towards its neutral position, said controller being characterized by:
   A. a first gimbal joint comprising
      (1) a first gimbal member mounted to rotate about one of said stick axes and
      (2) means mounting said control section for rotation with said first gimbal member about said one stick axis and for rotation relative to the first gimbal member about the other stick axis;

B. a second gimbal joint spaced along said one stick axis from the first gimbal joint and comprising
   (1) a second gimbal member rotatable about said one axis and
   (2) a third gimbal member rotatable with the second gimbal member about said one axis and rotatable relative to the second gimbal member about a gimbal axis which is parallel to said other stick axis, there being a signal generator and stick force generating means connected with each of said second and third gimbal members;

C. means providing a rigid connection between said first gimbal member and said second gimbal member whereby they are constrained to swing in unison about said one axis; and D. motion transmitting means connected between said control section and said third gimbal member for constraining the latter to swing about said gimbal axis in unison with swinging of the control section about said other stick axis.

9. The controller of claim 1 wherein one of said members of the second gimbal joint is carried by a relatively stationary supporting section and is rotatable relative thereto and wherein the other of those gimbal members is carried by said one gimbal member and is rotatable relative to the latter, further characterized by said stick force generating means comprising:
   (1) a first spring reacting between said stationary supporting section and said one gimbal member; and
   (2) a second spring reacting between said one gimbal member and said other gimbal member.

* * * * *